(12) United States Patent
Mehrhoff et al.

(10) Patent No.: US 11,705,023 B2
(45) Date of Patent: Jul. 18, 2023

(54) FLEXIBLE PAYMENT CARD

(71) Applicant: Mastercard International Incorporated, Purchase, NY (US)

(72) Inventors: Shawn J. Mehrhoff, Saint Ann, MO (US); Christopher T. Scholl, Florissant, MO (US)

(73) Assignee: Mastercard International Incorporated, Purchase, NY (US)

( * ) Notice: Subject to any disclaimer, the term of this patent is extended or adjusted under 35 U.S.C. 154(b) by 234 days.

(21) Appl. No.: 16/783,614

(22) Filed: Feb. 6, 2020

(65) Prior Publication Data

US 2021/0248856 A1 Aug. 12, 2021

(51) Int. Cl.
*G09F 9/30* (2006.01)
*G09G 3/00* (2006.01)

(52) U.S. Cl.
CPC ............. *G09F 9/301* (2013.01); *G09G 3/035* (2020.08)

(58) Field of Classification Search
None
See application file for complete search history.

(56) References Cited

U.S. PATENT DOCUMENTS

| 9,560,751 | B2 * | 1/2017 | Huitema | H05K 1/028 |
| 2005/0194451 | A1 * | 9/2005 | Laude | G06K 19/07745 |
| | | | | 235/492 |
| 2013/0222349 | A1 * | 8/2013 | Baek | G06F 15/0241 |
| | | | | 345/204 |
| 2014/0224882 | A1 * | 8/2014 | Hackler, Sr. | G06K 19/025 |
| | | | | 235/492 |
| 2015/0262052 | A1 * | 9/2015 | Pahuja | G06Q 20/363 |
| | | | | 340/10.52 |
| 2017/0111634 | A1 * | 4/2017 | Ekambaram | H04N 13/395 |
| 2017/0357979 | A1 * | 12/2017 | Khurana | H04L 63/102 |
| 2019/0212780 | A1 * | 7/2019 | Choi | G09G 3/3266 |
| 2021/0104582 | A1 * | 4/2021 | Kim | G06F 1/1652 |

* cited by examiner

*Primary Examiner* — Matthew Yeung
(74) *Attorney, Agent, or Firm* — Hovey Williams LLP (57) ABSTRACT

A rollable payment card is shiftable between a flat configuration and a rolled configuration via a manual rolling process. The payment card comprises a verification element, a processor, an electronic display unit in communication with the processor, and a power element providing electrical power to the display unit. The electronic display unit includes an electronic display region configured to display an image. The electronic display region is manually rollable. The payment card in the flat configuration presents horizontally spaced apart first and second ends and vertically spaced apart top and bottom edges. The first end overlaps the second end during the course of the rolling process, with the first end being disposed arcuately past the second end when the payment card is in the rolled configuration.

16 Claims, 7 Drawing Sheets

FLEXIBLE PAYMENT CARD

FIELD

The present invention relates generally to a flexibly deformable payment card. The payment card includes a dynamic display.

BACKGROUND

Those of ordinary skill in the art will appreciate that secure, efficient, durable, easy-to-use, and customizable payment methods offer many benefits to consumers. Conventional payment cards to at least some extent offer security, efficiency, and ease of use. However, such conventional cards are substantially rigid and only slightly bendable without permanent deformation, damage, and/or loss of functionality occurring. Such structural constraints limit the storage and portability options available. For instance, rigid, conventional payment cards are not well suited for carrying in certain pockets (like a back pocket of a pair of trousers) due to lack of bendability, cannot be reconfigured for storage in non-flat receptacles, and so on.

Furthermore, conventional cards with printed designs are limited to only a single design and a single presentation of information. That is, an entirely new card must be acquired to change any aspect of the appearance of the card (for example, background design, expiration date, cardholder name). Realtime presentation of relevant information to the cardholder via the card itself is also impossible.

SUMMARY OF THE INVENTION

According to one aspect of the present invention, a rollable payment card is provided. The payment card is shiftable between a flat configuration and a rolled configuration via a manual rolling process. The payment card comprises a verification element, a processor, an electronic display unit in communication with the processor, and a power element providing electrical power to the display unit. The electronic display unit includes an electronic display region configured to display an image. The electronic display region is manually rollable. The payment card in the flat configuration presents horizontally spaced apart first and second ends and vertically spaced apart top and bottom edges. The first end overlaps the second end during the course of the rolling process, with the first end being disposed arcuately past the second end when the payment card is in the rolled configuration.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE FIGURES

Preferred embodiments of the present invention are described in detail below with reference to the attached drawing figures, wherein.

The drawing figures do not limit the present invention to the specific embodiments disclosed and described herein. The drawings do not necessarily provide exact dimensions or tolerances for the illustrated components or structures, nor are the drawings precisely to scale with respect to the relationships between the components of the structures illustrated in the drawings.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Furthermore, unless specified or made clear, the directional references made herein with regard to the present invention and/or associated components (for example, top, bottom, upper, lower, inner, outer and so on) are used solely for the sake of convenience and should be understood only in relation to each other. For instance, a component might in practice be oriented such that faces referred to as "top" and "bottom" are sideways, angled, inverted, and so on relative to the chosen frame of reference.

Overview

With initial reference to FIGS. 1-4B, a flexibly deformable payment card 10 is provided. The payment card 10 preferably includes a verification element 12, a communications element 14, a memory element 16, a display unit 18, a power element 20, and a processor 21. Each of these elements, along with additional permissible elements, will be discussed in greater detail below. Exemplary methods of using the payment card 10 (and the components thereof) will also be discussed.

It is noted that it is also necessary to additionally provide appropriate wiring, processors, power, and so on for operation of certain of the elements described herein. These necessary supportive components are well known to those of ordinary skill in the art and are therefore not described in detail herein, nor are they illustrated in the drawing figures.

Figure 1:
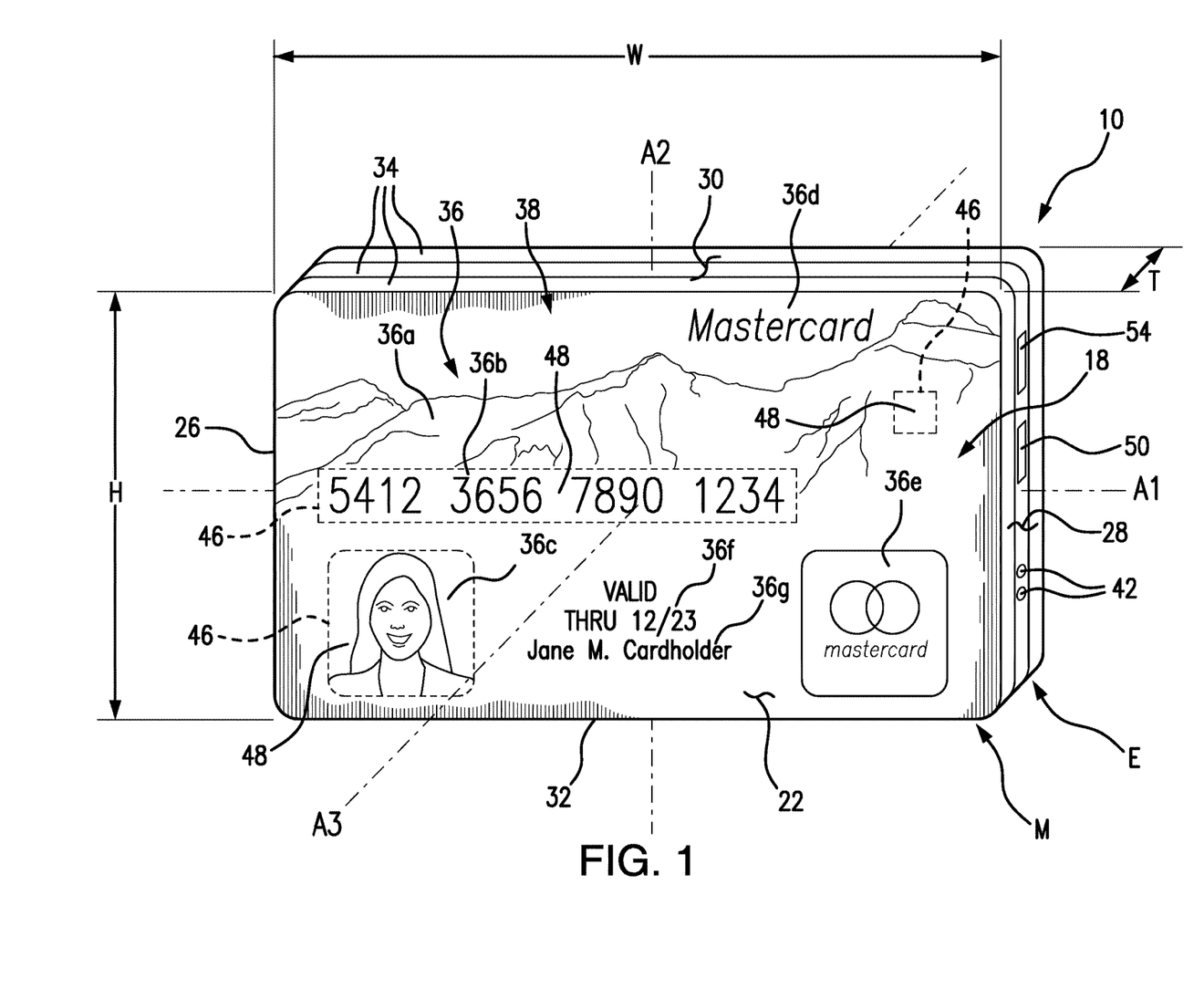
FIG. 1 a front perspective view of a payment card in accordance with a first embodiment of the present invention, in a flat configuration.
Figure 2:
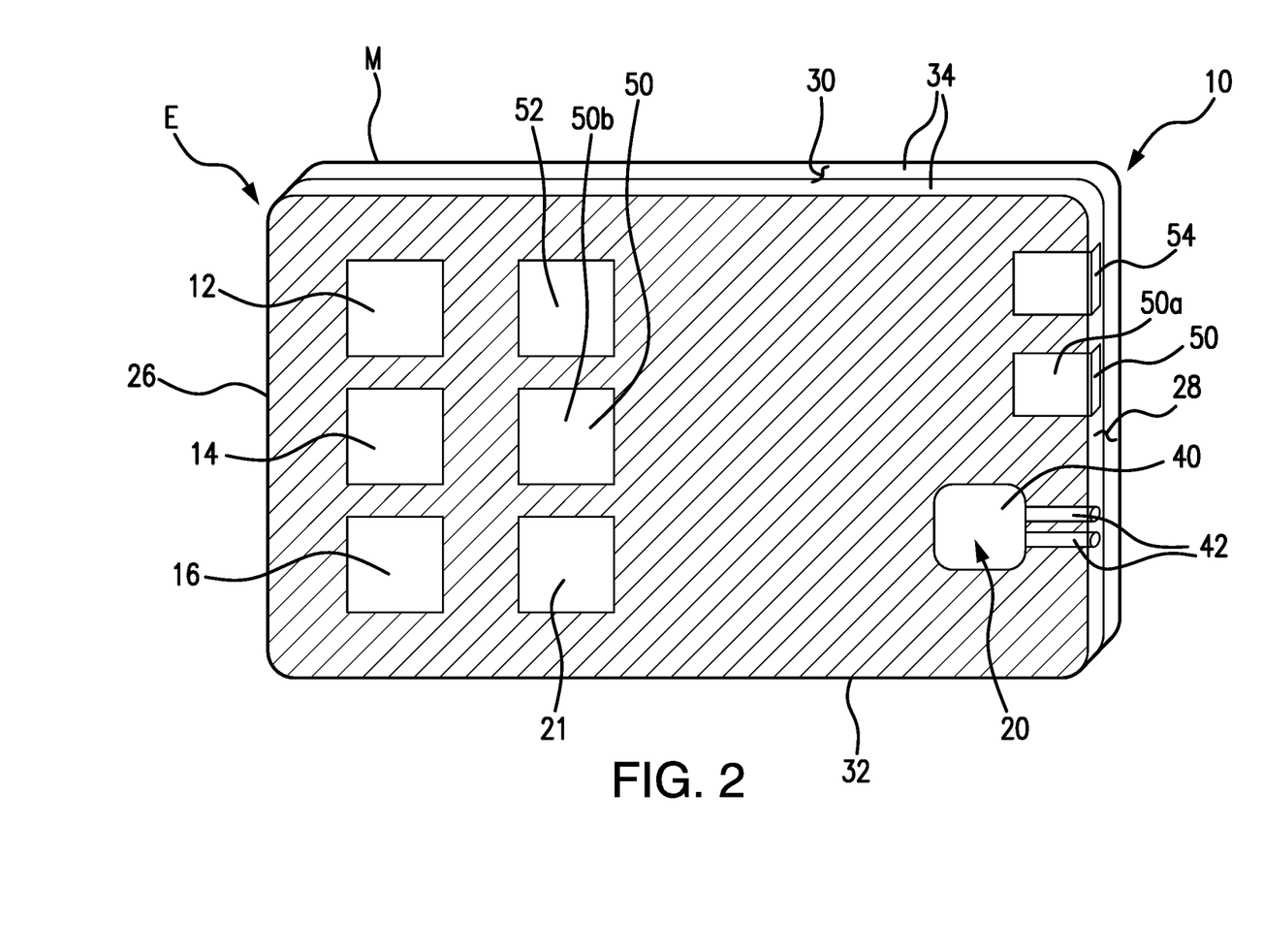
FIG. 2 is a sectioned front perspective view of the payment card of FIG. 1, in the flat configuration.
Figure 3:
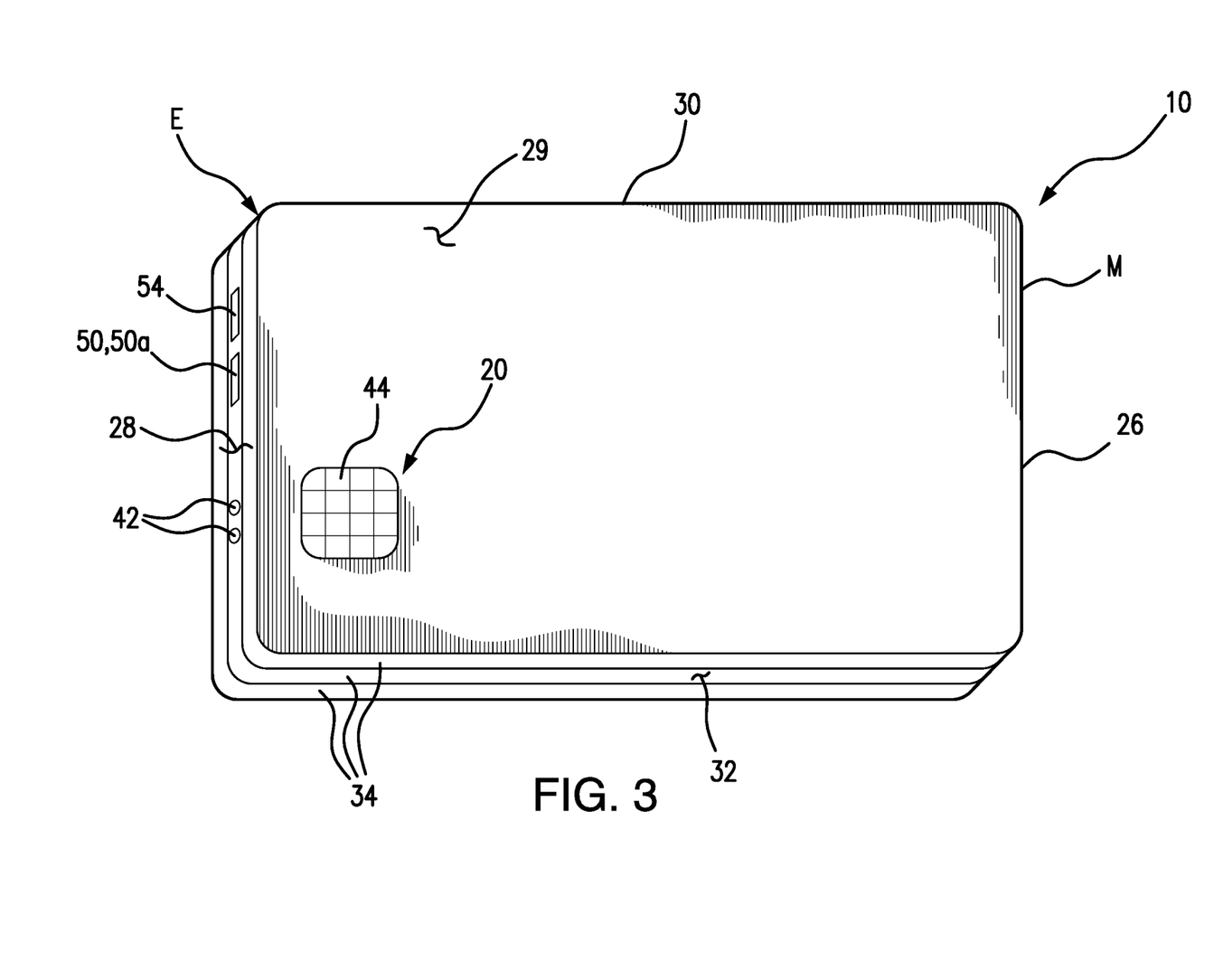
FIG. 3 is a rear perspective view of the payment card of FIGS. 1 and 2, in the flat configuration.

Broadly speaking, the payment card 10 preferably presents a front face 22, a back face 24, a pair of ends or side faces 26 and 28, a top edge or face 30, and a bottom edge or face 32. Each of the side, top, and bottom faces 26, 28, 30, and 32 extends between and interconnects the front and back faces 22 and 24. As noted previously, the payment card 10 is flexibly deformable. In an undeformed state (that is, a flat configuration) as shown in FIGS. 1-3, however, the side, top, and bottom faces 26, 28, 30, and 32 preferably define a card perimetrical margin M, with the margin M and the front and back faces 22 and 24 combining to define a card envelope E. The margin M preferably defines a generally rectangular shape of the payment card 10, although other shapes are permissible without departing from the scope of the present invention. Most preferably, the payment card 10 is in the form of a rectangle with slightly rounded corners.

The payment card 10 preferably defines a long axis A1 extending from side face 26 to side face 28 and therebeyond in both directions; a short axis A2 extending from top face 30 to bottom face 32 and therebeyond in both directions; and a depth axis A3 extending from the front face 22 to the back face 24 and therebeyond in both directions.

The payment card 10 in the flat configuration presents a width W along the long axis A1, a height H along the short axis, and a thickness T along the depth axis A3. In the undeformed state, the envelope E has the same width W, height H, and thickness T as the payment card 10 itself. As will be discussed in greater detail below, however, the dimensions of the envelope E will vary as the payment card 10 flexibly deforms.

The payment card 10 is preferably constructed of a plurality of layers or laminations 34, with the laminations 34 cooperatively presenting the side, top, and bottom faces 26, 28, 30, and 32. Single ones of the laminations 34 preferably present respective ones of the front and back faces 22 and 24. For clarity, only three (3) laminations are illustrated; however, more or fewer laminations might be provided without departing from the scope of the present invention. A non-laminated or unitary card body is permissible, as well.

Materials selection for the payment card 10 may vary also without departing from the scope of the present invention. However, as will be apparent from the below, thermal, electrical and other considerations should be made. Furthermore, materials conducive toward the desired flexibility or deformability of the payment card 10, as will also be discussed in greater detail below, should be used.

Verification Element

Turning now to the components of the payment card 10, in a preferred embodiment, the verification element 12 comprises an EMV chip. As will be readily understood by those of ordinary skill in the art, the verification element 12 in the form of an EMV chip preferably functions both to securely store and to transmit information required to authenticate, authorize, and process transaction data.

Although an EMV chip is utilized in a preferred embodiment, it is particularly noted that the verification element might alternatively or additionally comprise an alternative integrated circuit chip, a magnetic stripe, a near-field communication (NFC) element, or a radio-frequency identification (RFID) element.

Communications Element

The communications element 14 is broadly configured to send and receive information to and/or from the payment card 10 to an external element. The external element may be one or more of, among other things, a bank, a retail facility, or a mobile device. The mobile device may be, among other things, a mobile phone, a laptop or tablet, a watch, and/or a health monitor. The mobile device may in some instances belong to the cardholder, although devices (such as a POS, ATM, or other terminal) owned or operated by others (for example, a merchant, bank, and so on) are also contemplated.

The specific means by which the communications element 14 sends and receives data will be dependent on the specific element to which and/or from which data is being sent and/or received. For instance, the communications element 14 may include signal or data transmitting and receiving circuits, such as antennas, amplifiers, filters, mixers, oscillators, digital signal processors (DSPs), and the like. Thus, the communications element 14 may be formed as an integrated circuit within an associated electronics board.

The communications element 14 may, in some embodiments, include a microcontroller and/or microprocessor for processing and formatting data before such data is transmitted.

The communications element 14 may establish communication wirelessly by utilizing radio-frequency (RF) signals and/or data that comply with communication standards such as cellular 2G, 3G, or 4G, IEEE 802.15.4 (compliant 2.4 GHz), IEEE 802.11 standard (such as WiFi), IEEE 802.16 standard (such as WiMAX), Bluetooth™, or combinations thereof. In some embodiments, the communications element 14 may be configured to transmit data via the Subnetwork Access Protocol (SNAP). In some embodiments, the data transmitted by the communications element 14 may initially be encrypted (for example, via the communications element itself or via a separate processing element integrated into the payment card or provided remotely) and then transmitted via the SNAP protocol.

Alternatively or additionally, the communications element 14 may establish communication through physical connectors or couplers that receive metal conductor wires or cables which are compatible with networking technologies, such as Ethernet or USB. In certain embodiments, the communications element 14 may also couple with optical fiber cables.

The communications element 14 might alternatively communicate via a local network such as a local area network (LAN). For example, the local network may be configured according to IEEE 802.15.4 (compliant 2.4 GHz) and/or IEEE 802.11 standard (such as WiFi). The local network may be configured as a mesh network or comprise a metro or wide area network such as the Internet or other cloud networks. The local network is preferably wireless but may, in some embodiments, be wired. The local network may include one or more servers, routers, switches, wireless receivers and transmitters, and the like, as well as electrically conductive cables or optical cables. Furthermore, the local network may include cellular or mobile phone networks, as well as landline phone networks, public switched telephone networks, fiber optic networks, or the like.

It is also permissible for the communications element 14 to communicate via a wide network such as a wide area network (WAN), such as the Internet or other cloud-based network. The wide network may be wired or wireless, and may include one or more servers, routers, switches, wireless receivers and transmitters, and the like, as well as electrically conductive cables or optical cables. Furthermore, the wide network may include cellular or mobile phone networks, as well as landline phone networks, public switched telephone networks, fiber optic networks, or the like.

Memory Element

In a preferred embodiment, the memory element 16 stores user-provided data and/or data associated with the communications element 14. For instance, the memory element 16 may store data, such as binary data, including text, databases, graphics, audio, video, combinations thereof, and the like. The memory element 16 may also be known as a "computer-readable storage medium" and may include random access memory (RAM), read only memory (ROM), flash drive memory, or combinations thereof.

Display Unit

In a preferred embodiment, the display unit 18 is configured to display a desired image 36. The display image 36 preferably varies situationally, as will be discussed in greater detail below, and may include one of more of the credit card issuer, credit card name, card number, cardholder name, date of account opening, network, expiration date, photographs, advertisements, coupons, post-purchase messages, and so on. In the illustrated embodiment, for instance, a main or background image 36a, a card number image 36b, a cardholder headshot image 36c, a card name image 36d, a card issuer logo image 36e, a validity image, and a cardholder name image 36g are provided.

The display unit 18 preferably includes a display region 38, with the display region 38 most preferably being in the form of an organic light-emitting diode (OLED) display. It is permissible according to some aspects of the present invention, however, for the display region to instead be in the form of a liquid crystal display (LCD), a thin film transistor-LCD (TFT LCD), a three-dimensional (3D) display, an e-ink display, or another form of variable display.

It is also permissible according to some aspects of the present invention for multiple display regions to be provided, with such regions being disposed adjacent one another or spaced apart. Furthermore, the display regions may all be of the same type (for example, OLED) or may vary.

Most preferably, to facilitate thinness of the display unit 18 (and, in turn, the payment card 10 as a whole), backlighting is not necessary.

The display unit 18 (and, in turn, the display region 38) in a preferred embodiment extends continuously to and between the side, top, and bottom faces 26, 28, 30, and 32 so as to be sized and shaped identically to the perimetrical margin M. In alternative terms, the display region 38 preferably encompasses the entirety of the front face 22 of the payment card 10. However, it is permissible according to some aspects of the present invention for the display unit to be sized and/or shaped differently than the margins. For instance, the display unit might constitute only a small portion of the front face, with the remainder of the front face comprising, for instance, conventional plastic on which appropriate indicia (such as branding, card number, cardholder name, and so on) is printed or stamped. Still further, in some embodiments, the display unit might be omitted entirely. (That is, in some embodiments, the payment card might be devoid of an electronic display.)

Power Element

The power element 20 is preferably provided to power the display unit 18 and any other necessary components. The power element 20 preferably includes a battery 40. The battery 40 is most preferably rechargeable, with the power element 20 further including electrical connectors 42 in communication with the battery 40 to enabling recharging thereof.

The battery 40 most preferably presents a very low thickness to minimize added bulk to the card 10 and additionally facilitate deformability. For instance, in a preferred embodiment, the battery 40 is a rechargeable flexible organic radical battery.

It is noted that alternative or additional power elements and sources, including but not limited to lithium ion batteries, solar panels, and/or kinetic batteries, may be used. In the illustrated embodiment, for instance, a solar panel 44 is provided. Still further, it is permissible according to some aspects of the present invention for remote power to be provided from an external source such as a point of sale or mobile device using, for instance, near-field magnetic induction charging.

It is also permissible without departing from the scope of the present invention for sensors for tracking remaining battery power to be provided.

Touch Sensor

In a preferred embodiment, a plurality of touch sensors 46 are provided. As noted above as illustrated (via hidden lines) in FIG. 1, each touch sensor 46 is preferably positioned so as to sense a touch with respect to the display region 38. More particularly, the touch sensors 46 are preferably formed integrally with the display unit 18 (for example, disposed on a substrate of the display unit or provided inside the display unit), with relevant portions of the display unit 18 thereby forming respective touch screen regions 48 associated with each touch sensor 46. However, a touch sensor might alternatively be disposed on another portion of the card.

The touch sensors might be of any type, including but not limited to resistive, surface capacitive, acoustic wave, infrared, or strain gage. Alternatively, the touch sensors may be configured in the form of a film having a touch pattern and disposed adjacent or applied to the display unit, or may be a metal wire directly patterned onto a surface adjacent the display unit Still further, the touch sensors might additionally or alternatively be in the form of one or more physical buttons.

On-Off Sensor

To conserve battery power, one or more on-off sensors 50 is preferably provided to determine an appropriate on-off response for the display unit 18. In the illustrated embodiment, a first one of the on-off sensors 50 comprises a light sensor 50a, such that placement of the card 10 in storage (for example, in a purse, pocket, or container) leads to decreased light sensed by the on-off sensor 50 and subsequent powering off of the display unit 18. Energy in the battery 40 is thus conserved. A second on-off sensor 50 comprises a motion or acceleration sensor 50b.

An on-off sensor in the form of a gyroscope sensor, a proximity sensor, an infrared sensor, and/or an RGB sensor might alternatively or additionally be provided for the same or similar purposes.

Geolocation Element

It is permissible according to some aspects of the present invention for a geolocation element 52 to be provided to enable transmittal of appropriate content to the display unit 18, as will be discussed in greater detail below. The geolocation element 52 is preferably in the form of a global positioning system (GPS) chip.

However, as will be discussed below, the GPS chip may in some embodiments be replaced by an element such as an RFID chip that is sensed externally to provide a user's location when in proximity to a compatible reader.

Speakers

One or more speakers 54 might also be provided. In the illustrated embodiment and as discussed in greater detail below, the speaker 54 could permissibly transmit musical sounds, audio advertisements, and so on.

Flexibility

Flexibility of the payment card 10 is an essential feature thereof. More particularly, the payment card 10 is preferably rollable in the direction of the long axis A1 or, alternatively stated, rollable around a rolled axis A4 (see FIGS. 4A and 4B) that, prior to rolling, is parallel to the short axis A2. That is, the payment card 10 is preferably rollable into a cylindrical form circumscribing the axis A4.

Rollability in the direction of the short axis in addition to or instead of rollability in the direction of the long axis is permissible according to some aspects of the present invention. Additional modes of flexibility (for example, diagonal rollability, warpability, and variable-direction rollability) are also permissible according to some aspects of the present invention.

Preferably, the entirety of the payment card 10 is flexibly deformable. That is, the various components thereof (for instance, the verification element 12, the communication element 14, the memory element 16, and so on) are all preferably flexibly deformable in and of themselves. Careful design and/or selection of components is necessary to facilitate such flexibility. For instance, as noted previously, use of a flexible OLED display unit 18 and a flexible organic radical battery 40 is preferred.

Figures 4A, 4B:
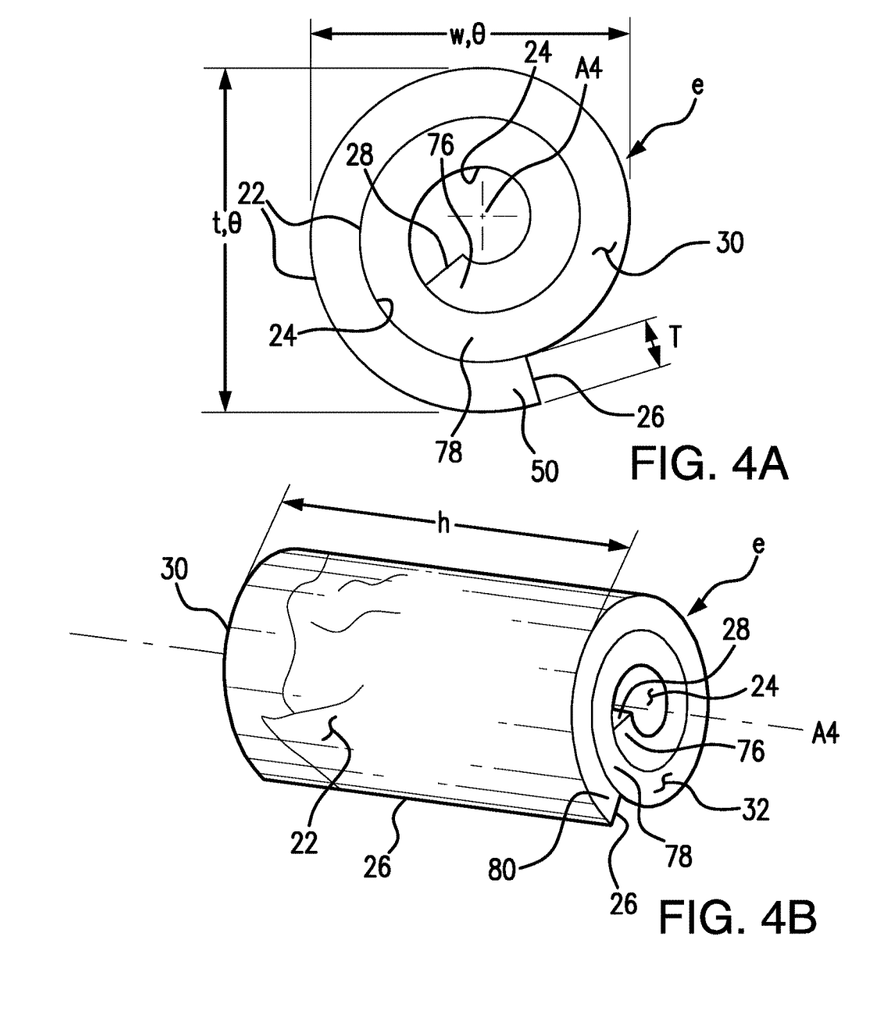
FIG. 4A is a top view of the payment card of FIGS. 1-3, in a rolled configuration, with individual laminations not illustrated.
FIG. 4B is a perspective view of the payment card of FIGS. 1-4A, in the rolled configuration, with individual laminations not illustrated.

The rolled payment card 10 as illustrated in FIGS. 4A and 4B presents a cylindrical envelope e presenting a width w, a height h, and a thickness t. The width w and the thickness t are preferably at least substantially equal to one another (though perhaps varying by the thickness T depending on how many overlapping layers are present at the location of measurement) and, more particularly, are at least approximately equivalent to the diameter θ of the cylindrical envelope e. The width w of the rolled payment card 10 is preferably less than about fifty percent (50%) of the original width W of the unrolled payment card 10. The width w of the rolled payment card 10 is more preferably less than about twenty-five percent (25%) of the original width W of the unrolled payment card 10. Most preferably, the width w of the rolled payment card 10 is less than about ten percent (10%) of the original width W of the unrolled payment card 10. The height h of the rolled payment card 10 is preferably equal to the height H of the unrolled payment card 10, as no deformation preferably occurs in that direction. (It is particularly noted that the drawing figures are schematic in nature, with the illustrated dimensions not being to scale. Furthermore, for the sake of clarity, the laminations 34 are not shown in FIGS. 4A and 4B)

Alternatively described, the first end or side face 26 overlaps the second end or side face 28 during the rolling process, with the first end 26 being disposed arcuately past the second end 28 when the payment card 10 is in the rolled configuration.

Furthermore, most preferably, at least three (3) overlapping layers 76, 78, and 80 are formed at least one arcuate location, with two (2) or more of the layers 76, 78, and 80 at least in part engaging one another.

Preferably, the degree of flexibility of the card 10 as a whole is such that the rolling process can easily be accomplished manually. That is, extreme application of force is unnecessary. However, inadvertent rolling of the card 10 is likewise undesirable. Provision of one or more components to bias the card appropriately (adding rigidity and/or aiding in rolling, and so on) is permissible without departing from the scope of the present invention. For instance, an embedded bi-stable spring band might be provided to encourage the card to rest in either a flat or rolled state rather than an intermediate configuration. Restriction of rolling to only one direction could also be achieved.

In the illustrated embodiment, the display region 38 faces outward to maximize its minimum radius of curvature in the rolled configuration. However, it is permissible according to some aspects of the present invention for the display region to instead be oppositely oriented.

Partially Rigid Embodiment

In some embodiments, one or more inflexible regions may be necessary or desirable (for example, for cost purposes) due to the presence of inflexible components. Most preferably, any such inflexible components are grouped in such a manner as to minimize their effect on the overall flexibility of the payment card. Such an embodiment is shown in FIGS. 5-7B. It is initially noted that, with certain exceptions to be discussed in detail below, many of the elements of the payment card 110 of the second embodiment are the same as or very similar to those described in detail above in relation to the payment card 10 of the first embodiment. Therefore, for the sake of brevity and clarity, redundant descriptions and numbering will be generally avoided here. Unless otherwise specified, the detailed descriptions of the elements presented above with respect to the first embodiment should therefore be understood to apply at least generally to the second embodiment, as well.

Figure 5:
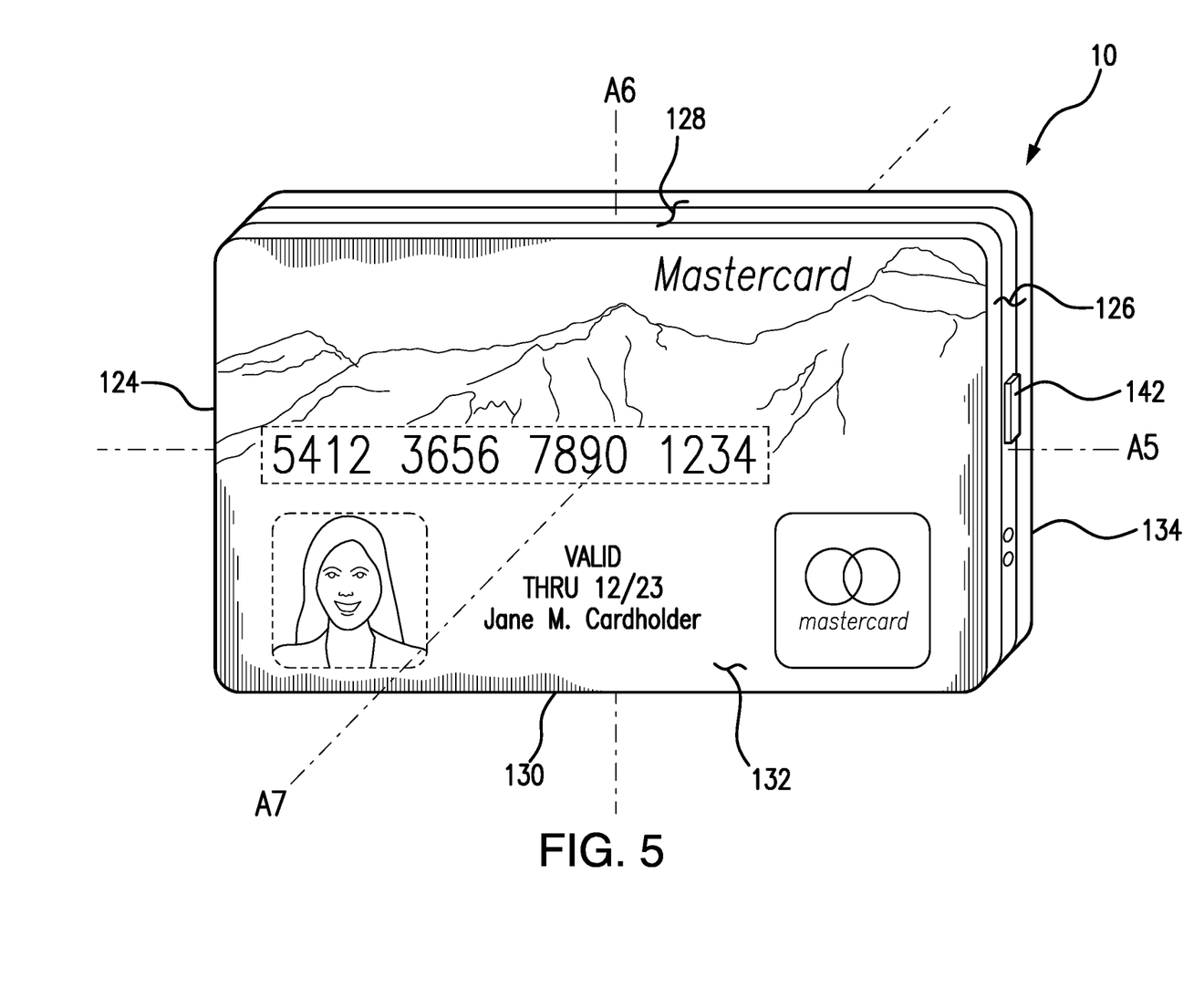
FIG. 5 is a front perspective view of a payment card in accordance with a second embodiment of the present invention, in a flat configuration.
Figure 6:
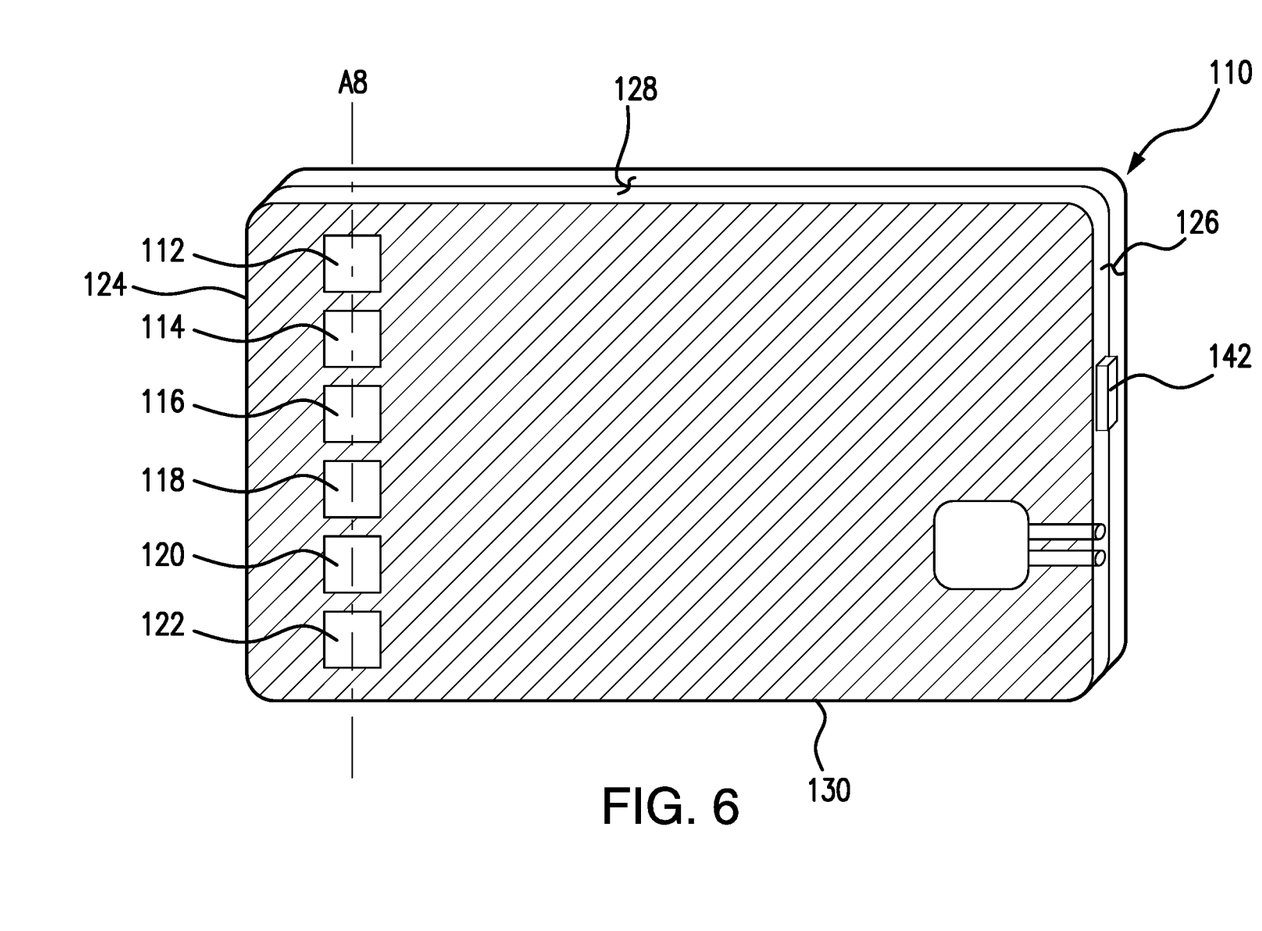
FIG. 6 is a sectioned front perspective view of the payment card of FIG. 5, in the flat configuration.

As best shown in FIG. 5, the payment card 110 defines a long axis A5 and a short axis A6. As best shown in FIG. 6, the payment card 110 includes a communications element 112, a verification element 114, a processor 116, a memory element 118, a geolocation element 120, and an on-off sensor 122 in the form of a motion sensor.

The payment card 110 includes first and second ends or side faces 124 and 126, spaced along the long axis A5, and top and bottom faces 128 and 130 spaced along the short axis A6. Front and back faces 132 and 134 are spaced along a depth axis A7.

As illustrated, the components 112-122 are preferably provided in axial alignment with each other, stacked in the direction of the short axis A6, and placed adjacent the side face 124 of the card 110. Alternatively stated, the components 112-112 are preferably aligned along an axis A8 that is parallel to the side faces 124 and 126, as well as the short axis A6. Each of the components 112-122 is at least substantially rigid or inflexible in nature so as to not be "rollable."

Figure 7A:
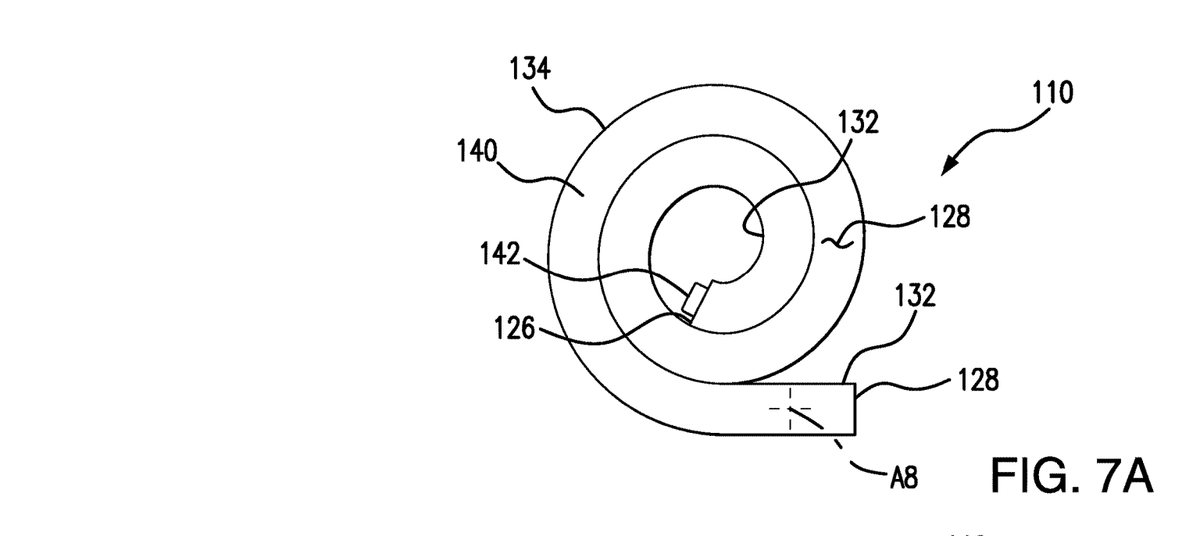
FIG. 7A is a top view of the payment card of FIGS. 5 and 6, in a rolled configuration, with individual laminations not illustrated.
Figure 7B:
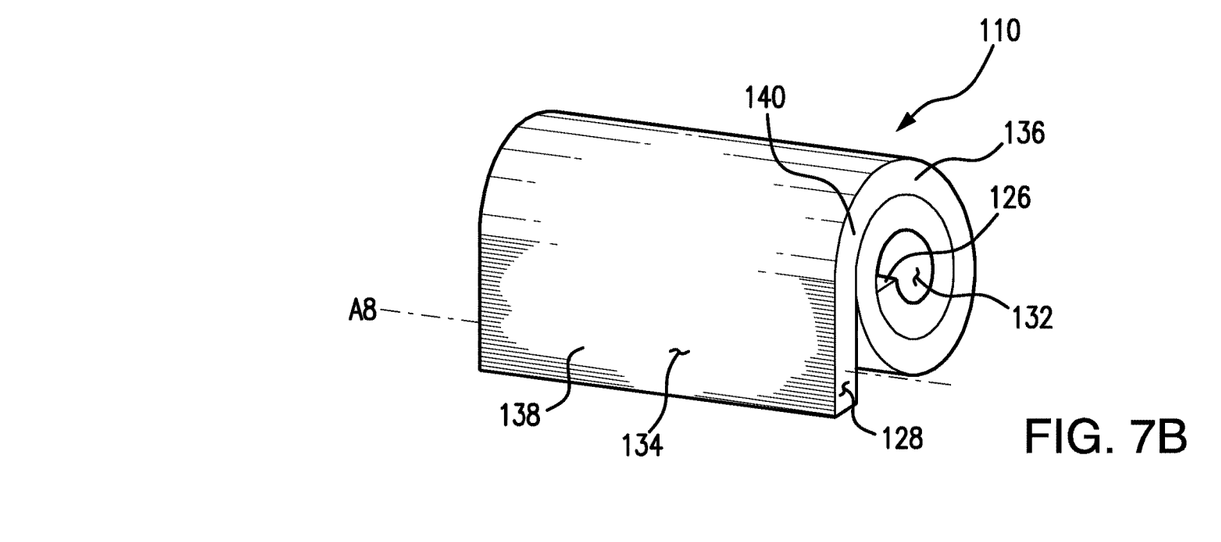
FIG. 7B is a perspective view of the payment card of FIGS. 7A, in the rolled configuration, with individual laminations not illustrated.

As shown in FIGS. 7A and 7B, when the card 110 is in a rolled configuration, a flexible or rolled portion 136 and a rigid or flat portion 138 are formed. The flat portion 138 is formed in an outer layer 140 of the rolled card 110 and contains the generally inflexible components 112-122. That is, the generally rigid components 112-122 are isolated in a flat portion 138 that forms a portion of an outer layer 140 of the rolled card 110.

It is noted that the variation in curvature between the flat portion 138 and the adjacent portion of the card 110 (i.e., the rolled portion of the outer layer 140) is minimized relative to the variation that would occur if the card were rolled in an opposite direction so as to place the flat portion at the core of the rolled cylinder (where a tighter radius of curvature would be found in the adjacent portion).

In contrast to the front face 22 of the card 10, the front face 132 of the card 110 faces inward in the rolled configurations. That is, the back face 134 is exposed.

The flat portion 138 may in some instances be used to restrict shifting or rolling of the payment card 110 on a surface such as a table (see FIG. 7A). Alternatively, the flat portion 128 might be used to prop up the card 110. In an alternate embodiment in which the display region were instead faced outward, one or more images (a clock, notifications, weather, and so on) might be made visible in the rolled/propped state.

The card 110 is provided with a power button 142 to enable a user to directly control power usage.

Operational Examples

In a first method of use, featuring the fully flexible payment card 10, a customer (that is, a cardholder) enters a retail environment to begin shopping. The flexible payment card 10, rolled into a compact cylinder, is safely and conveniently carried in a waterproof, dustproof, floatable protective tube attached to the customer's keyring. The geolocation element 52 (more specifically, a GPS chip) in the payment card 10 identifies the customer's presence in the retail environment and communicates this to a retail system via the communications element 14. The customer removes the payment card 10 from the protective tube and unrolls the payment card 10, exposing the on-off light sensor 50. The flexible OLED display unit 18 turns on as a result of the light sensor 50 exposure. An advertisement or coupon received from the retail system is displayed as the main or background image 36a on the display region 38, temporarily replacing a family camping photograph image that was previously provided by the customer and stored on the memory element 16. Upon completion of the shopping trip, the customer approaches a point of sale to pay for several items, including a fishing rod. After the items have been scanned, the customer initiates payment via an EMV reader provided at the point of sale. Instead of providing a driver's license or other form of identification to a clerk, the customer simply presses the touch screen region 48 associated with the headshot image 36c to display an enlarged headshot on the display region 38. The enlarged headshot enables the clerk to visually confirm the customer's identity as the cardholder. Upon completion of the payment transaction, an image of the customer and the newly purchased fishing rod is incorporated into a personalized lake scene that is shown on the display region 38, along with an appreciation message from the retailer, as yet another new main image 36a.

Upon departure of the customer from the retail environment, as communicated by the geolocation element 52, the display region 38 again shows the original family photograph as the main or background image 36a. The display unit 18 turns off upon loss of light detected by the light sensor 50a, as when the customer slips the payment card 10 into a clothing pocket or back into the tube referenced above (second sentence of this section), where the flexibility of the card enables it to comfortably conform to the body of the customer or the walls of the tube without incurring damage. The customer later connects the payment card 10 to a charger to recharge the flexible organic radical battery 40 via the connectors 42. The static state of the card 10 is detected by the motion sensor 50b, which overrides the light sensor 50a to turn off the display unit 18 during the charging process.

In a second method of use, a customer is wearing a health monitor. The heath monitor relays data to the payment card 10 carried by the customer. The data indicates the customer may be experiencing high levels of stress. In response, the flexible display region 38 of the card 10 shows an advertisement as the main image 36a, suggesting a walk in a nearby botanical garden. The advertisement includes soothing music played through the speakers 54. The customer taps on the touch screen region 48a associated with the advertisement to pre-order a day pass to the botanical garden. Upon arrival of the customer at a kiosk of the botanical garden, as indicated by a geolocation element 52 (more specifically, an RFID chip embedded in the card 10 and detected by a reader in the kiosk), the transaction proceeds, culminating in a printout of an entry pass. While enjoying the garden, the customer carries the card 10 so as to expose the solar panel 44 thereon to sunlight, thus recharging a battery 40.

In a third method of use, the payment card 110 is linked to a mobile device (for example, a mobile phone) of a customer to facilitate more powerful processing, enable more efficient communication, provide greater data storage, and so on. For instance, the mobile phone might include a geolocation element, a memory element, and a processing element that replace or work in conjunction with those embedded in the card 110.

In a fourth method of use, the payment card 10 or 110 is used in a manner similar to one of the scenarios described above, but without unrolling of the card occurring during one or more payment transactions (or other card-facilitated transactions). That is, in some methods of use, transactions may occur utilizing the payment card in its rolled form. It is further noted that certain protective cases might also be designed to enable transactions to occur not only without unrolling of the card but also without removal of the card therefrom.

Although the above description presents features of preferred embodiments of the present invention, other preferred embodiments may also be created in keeping with the principles of the invention. Furthermore, these other preferred embodiments may in some instances be realized through a combination of features compatible for use together despite having been presented independently as part of separate embodiments in the above description.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A flexibly deformable, rollable payment card shiftable between a flat configuration and a rolled configuration via a manual rolling process, said payment card comprising:
   a plurality of laminations;
   a plurality of rigid internal components disposed in said laminations,
   said rigid internal components including—
     a verification element,
     a processor,
     a communications element configured to send and receive information to and/or from the payment card to an external element,
     an on-off sensor configured to determine an appropriate on-off response for the display unit, and
     a geolocation element enabling transmittal of content to the display unit;

an electronic display unit in communication with the processor; and a power element providing electrical power to the display unit, said electronic display unit including an electronic display region configured to display an image that varies situationally, said electronic display region being manually rollable, said payment card in the flat configuration presenting a front face and a back face, said front face being presented by a first one of the laminations and said back face being presented by a second one of the laminations, said payment card further including laterally spaced apart first and second ends and longitudinally spaced apart top and bottom edges, said first end overlapping said second end during the course of the rolling process, with said first end being disposed arcuately past said second end when the payment card is in the rolled configuration, said payment card including a flexible, rollable region and a flat, rigid, non-rollable region adjacent the rollable region, said non-rollable region being disposed adjacent one of the ends and extending between the top and bottom edges along a non-rollable region axis parallel to said one of the ends, said non-rollable region being rectangular in shape, said non-rollable region defining in part an outer layer of the payment card in the rolled configuration such that a variation in curvature between the flat portion and an adjacent flexible portion of the card is minimized, each of said plurality of rigid internal components being axially aligned within and isolated in said non-rollable region so as be stacked along the non-rollable region axis and placed adjacent the first side edge, said payment card in the rolled configuration presenting at least three overlapping layers, at least two of said overlapping layers engaging one another, said payment card in the flat configuration having a rectangularly prismatic envelope having a lateral first width, said payment card in the rolled configuration having a cylindrical envelope having a lateral second width, said second width being less than one fourth of said first width.

2. The payment card of claim 1,
said verification element being an EMV chip.

3. The payment card of claim 1,
said power element comprising a rechargeable flexible organic radical battery.

4. The payment card of claim 1,
said power element comprising a solar panel.

5. The payment card of claim 1,
said electronic display region comprising a plurality of organic light-emitting diodes.

6. The payment card of claim 1,
said electronic display unit including a touch sensor integrated with said electronic display region.

7. The payment card of claim 1,
said payment card further comprising a memory element configured to store data.

8. The payment card of claim 1,
said image being provided by a cardholder.

9. The payment card of claim 8,
said image including a photograph of the cardholder.

10. The payment card of claim 1,
said image being provided by a retailer.

11. The payment card of claim 10,
said image including an advertisement.

12. The payment card of claim 1,
said second width being less than one tenth of said first width.

13. The payment card of claim 1,
said display region facing outward when the payment card is in the rolled configuration.

14. The payment card of claim 1,
said display region facing inward when the payment card is in the rolled configuration.

15. The payment card of claim 1,
said display region extending continuously to and between the first and second ends and the top and bottom edges to encompass the entirety of the front face of the payment card.

16. The payment card of claim 1,
said electronic display unit comprising a plurality of said electronic display regions.

* * * * *